Figure 1:
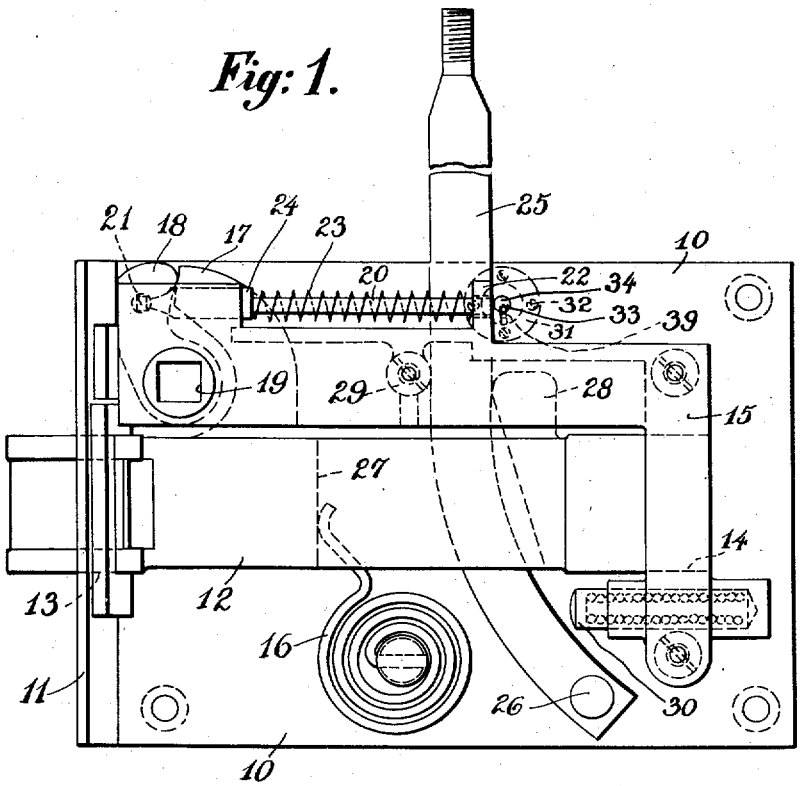

Apr. 3, 1923. Re. 15,569

L. OTTINGER

LATCH

Original Filed Jan. 29, 1920 2 sheets-sheet 1

Inventor
Leon Ottinger
By his Attorney C. P. Goepel

Apr. 3, 1923. Re. 15,569

L. OTTINGER

LATCH

Original Filed Jan. 29, 1920 2 sheets-sheet 2

Inventor
Leon Ottinger
By his Attorney C. P. Goepel

Reissued Apr. 3, 1923. Re. 15,569

UNITED STATES PATENT OFFICE.

LEON OTTINGER, OF NEW YORK, N. Y.

LATCH.

Original No. 1,386,422, dated August 2, 1921, Serial No. 354,960, filed January 29, 1920. Application for reissue filed December 5, 1922. Serial No. 605,093.

*To all whom it may concern:*

Be it known that I, LEON OTTINGER, a citizen of the United States, and resident of the borough of Manhattan, in the city, county, and State of New York, have invented certain new and useful Improvements in Latches, of which the following is a specification.

The present invention relates to improvements in latches, particularly latches for automobile doors, and has for an object to provide a latch which may be locked from the inside of the door in such manner as to prevent operation of the handles, but will at the same time allow the bolt to be freely pressed into retracted position when the latch is locked. An advantage of this feature is that in the event of accidentally locking the latch in the open position of the door, the bolt will be free to press back when closing the door, otherwise it would form a dead stop with the possibility of injuring the latch and door structure.

It is further proposed to provide a unitary locking device adapted to lock both the roll back handle and the lever handle in the case of those latches provided with two such handles and it is also an object to provide a locking attachment suitable for use on a latch of known construction without requiring material change in the latch, and which will not in any way interfere with the normal operation thereof.

It is an important feature of the present improvements to provide locking means particularly adapted for use in connection with automobile door latches of that type wherein the interior and exterior operating handles are spaced from each other longitudinally of the latch bolt and to provide a convenient location of the shiftable locking element adjacent to the interior operating handle and a novel arrangement of the part connected to the rollback lever of the exterior handle with respect to the interior operating lever for engagement by the locking element whereby a very compact association or arrangement of the several elements is obtained so that the entire latch mechanism with its locking means will occupy but a minimum of space in the door structure.

The latch, according to my invention, is particularly intended for use upon closed automobiles having four doors, its purpose being to allow the owner of the automobile to lock the latches upon three of the doors upon the inside before he leaves the car and lock one of the doors from the outside thereby locking all the doors by the actual locking from the outside of one latch.

With these and other objects in view, embodiments of my invention are shown in the accompanying drawings and these embodiments will be hereinafter more fully described with reference thereto and the invention finally pointed out in the claims.

Figure 2:
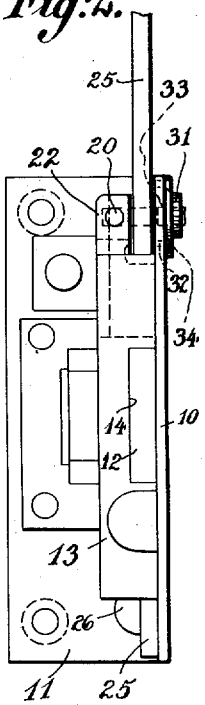
Figure 3:
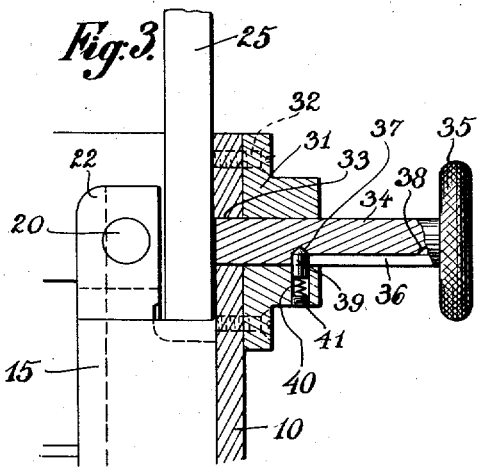
Figure 4:
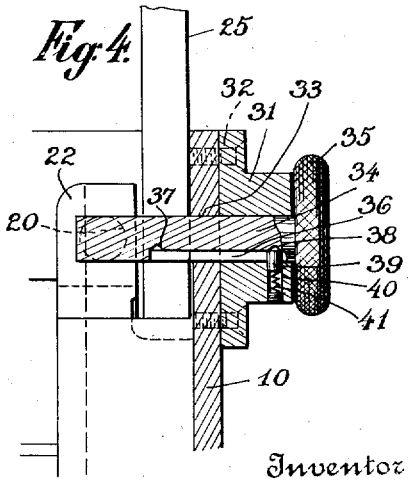
Figure 5:
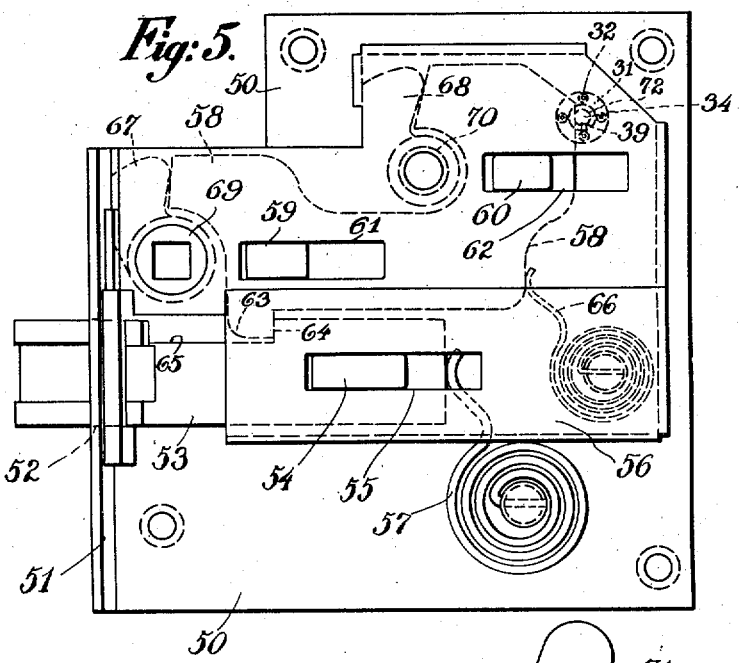
Figure 6:
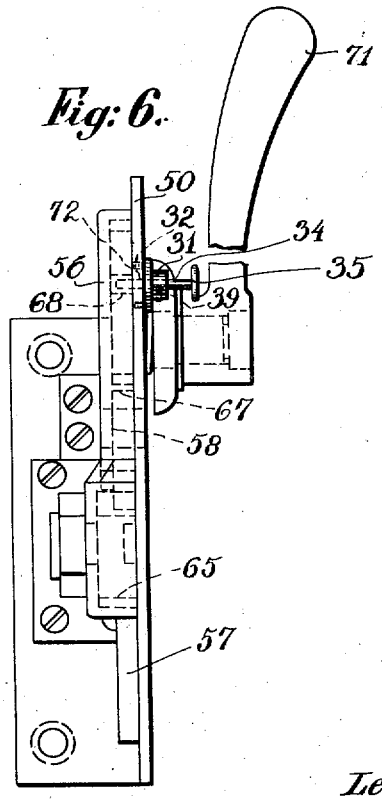

In the accompanying drawings, Figure 1 is a plan view of a latch embodying my improvements; Figure 2 is an end elevation; Figure 3 is an enlarged detailed sectional view of the locking device in the non-operative position thereof; Figure 4 is a similar view showing the same in the operative position; Figure 5 is a plan view of a modified form of latch embodying my improvements; and Figure 6 is an end elevation thereof.

Similar reference characters indicate corresponding parts throughout the several figures of the drawings.

Referring to the drawings and more particularly to Figs. 1 to 4 thereof, the embodiment of my invention shown therein consists of a latch comprising a base plate 10 provided at its forward edge with the face portion 11 bent outwardly therefrom and having mounted thereon a reciprocating bolt 12 having its nose projected through an opening 13 in the face 11. Its inner end is slidably disposed in an opening 14 of an angular frame piece 15 secured to the plate 10. The bolt is normally pressed forward by a coil spring 16 mounted on the plate 10 and is adapted in the usual manner to be forced back against the force of the spring in closing the door.

Upon the upper side of the bolt there is formed an extension arm 17 adapted to be engaged by a roll back lever 18 rotatably mounted between the plate 10 and frame 15 and connected in the usual manner to the outside of the door of the automobile, being provided for this purpose with a square opening 19 extending therethrough. In order to prevent rattling of the roll back lever 18 and the handle connected thereto, and prevent any looseness therein when the bolt is not fully projected, and at which time the lever arm 17 would not positively force the roll back against the face plate, there are provided spring means cooperating with the roll back to hold the same yieldingly and in engagement with the face portion 11. These means comprise a guide rod 20 pivotally connected at the one end 21 to the roll back, and slidable at its other end through a bracket 22 formed upon the frame 15, a helical spring 23 being mounted upon the rod, bearing at one end upon an enlargement 24 thereof and at the other end upon the bracket 22. The bolt is also adapted to be retracted independently of the roll back 18, by means of a lever 25 pivotally mounted at 26 upon the plate 10 extending through a cutout portion 27 of the bolt and engaging a lug 28 thereof at one side, its other side engaging a stop or abutment 29 formed upon the frame 15, the lever being normally held yieldingly in its position against the stop 29 by means of a spring pressed plunger 30 mounted upon the frame 15 and which is adapted when the bolt is retracted by means of the roll back or when it is not fully projected to prevent rattling of the lever. By swinging the lever 25 rearwardly about its pivot the bolt is moved to a retracted position independently of the roll back.

Upon the outer side of the plate and at a point adjacent to the rear edge of the bracket 22 and the lever 25 there is secured the locking device, according to my invention, and which comprises a flanged bushing 31 secured by screws or rivets 32 to the outer side of the plate 10, a hole 33 being drilled in the said plate in alinement with the passage through the bushing. Within the bushing there is mounted a bolt pin 34 having at its outer end a knurled head 35, and provided longitudinally with a key way 36 having at its ends depressed portions 37 and 38, a transversely movable plunger 39 being mounted in an opening 40 of the bushing and pressed inwardly by spring 41, and engaging the key way 36 to prevent turning movement of the bolt pin 34 and engaging the depressed portions 37 and 38 in the inner and outer moved positions of the bolt pin to yieldingly retain the same in these positions. In order to lock the latch handles against movement, the bolt pin is pressed to its inward position indicated in Fig. 4 in which position it constitutes an abutment preventing rearward movement of the lever 25 and also, through the rod 20, preventing operation of the roll back and the handle connected thereto. In this locked position of the handles, it will be seen that the bolt is free to be pressed inwardly to its retracted position. It will be noted that the rod 20 with which the locking pin 34 coacts is closely associated with the interior operating lever 25 and extends at right angles to the axis of said lever across one side thereof. This means for locking the exterior handle through the medium of the single shiftable locking pin 34, not only permits of the entire latch mechanism and locking means being arranged within a relatively small space in the door structure, but also enables me to so position the locking pin 34 that it is spaced a considerable distance inwardly from the edge of the door, and at a convenient point where it may be readily manipulated and will not be obtrusive.

In Figs. 5 and 6 I have illustrated a modified form of latch provided with my improvements which consists of a base plate 50 provided at one end with a face portion 51 having an opening 52 therein through which the nose of the bolt 53 is adapted to slide to projected and retracted positions, the rear end thereof being provided with a lug 54 engaging a guide slot 55 provided in a cover plate 56 mounted upon the base 50, the bolt being pressed yieldingly toward its projected position by means of a coil spring 57.

Beneath the cover plate 56 and above the bolt there is disposed a carriage member 58 having a pair of guide lugs 59 and 60 engaging slots 61 and 62 provided in the cover plate 56 and disposed parallel to the slot 55. An overhanging lug or finger 63 is provided at the lower edge of the carriage and engages a shoulder 64 formed upon the upper portion of the bolt 53, the bolt being cut away forwardly of the finger 63 as at 65 to permit retraction movement of the bolt independently of the carriage. The carriage 58 is normally pressed yieldingly forward by means of a coil spring 66 into engagement with a pair of roll back levers 67 and 68 rotatably mounted as at 69 and 70 between the cover plate 56 and the base plate 50, the roll back 67 adapted to be operated by the handle provided at the outer side of the door while the roll back 68 is adapted to be operated by a lever 71 connected thereto and provided at the inner side of the door. In order to lock the carriage 58 against movement and thereby the roll back levers 67 and 68 the locking attachment similar to that shown in Figs. 3 and 4 is secured to the plate 50 at a point adjacent to the rear edge of the carriage as indicated in the drawings, a hole 72 being drilled in the plate 50 in which is disposed the bolt pin 34. In operation the bolt pin is pressed inwardly so that it forms an abutment to prevent rearward movement of the carriage thereby locking the handles against movement while at the same time bolt 53 is free to be pressed into retracted position. It will be understood that the locking attachment may be provided at any suitable position relative to the carriage and the carriage may be provided with an opening in alinement with the opening formed in the base plate so that when the bolt pin is pressed inwardly it will engage this opening and thereby lock the carriage.

With my improvements a very effective and conveniently manipulated locking attachment is provided for automobile latches. It will be understood that the invention is not confined to use upon automobile door latches but may be used upon other types of latches, and also I do not propose to restrict the invention to a latch having two operative handles but the same may be also effectively employed with one operating handle.

I have illustrated and described preferred and satisfactory embodiments of my invention but it is obvious that changes may be made therein within the spirit and scope thereof as defined in the appended claims.

I claim:

1. In a latch, a rectilinearly movable latch bolt, means for retracting said bolt including independently operable members each adapted to effect retraction of the bolt, and a single means for preventing retraction of the bolt by the actuation of either of said members but permitting, when in its effective position, of the retraction movement of the bolt by pressure directly applied to one end of the bolt.

2. In a door latch for automobiles, a rectilinearly movable latch bolt, means for retracting said bolt including members independently operable from the exterior and interior of the door respectively and each adapted to effect retraction of the bolt, and means for locking said retraction means against actuation by either of said members but permitting, when in its locking position, of the retraction movement of the bolt by direct pressure thereon in the closing movement of the door.

3. In a latch, a rectilinearly movable latch bolt, primary and secondary independently operable means for retracting said bolt, and means common to both of said retraction means to lock one or both of such retraction means against effective operation.

4. In a latch, a spring bolt, retraction means operative to retract said bolt, and locking means adapted to be placed in the operative path of said retraction means to prevent operation thereof, said bolt adapted to be retracted independently of said last named means, and secondary retraction means adapted to retract said bolt independently of said first mentioned retraction means and also adapted to be locked against operation by said locking means.

5. In a latch, a rectilinearly movable latch bolt, independently operable retracting members spaced from each other longitudinally of the bolt, and locking means for one of said retracting members including a rectilinearly shiftable part operatively associated with the member to be locked and extending at right angles to the longitudinal axis of the other retracting member and across one side thereof.

In testimony that I claim the foregoing as my invention, I have signed my name hereunder.

LEON OTTINGER.